No. 733,425. PATENTED JULY 14, 1903.
W. D. RICHTER.
MACHINE FOR MAKING NEEDLE BARS FOR STRAIGHT KNITTING MACHINES.
APPLICATION FILED AUG. 22, 1902.
NO MODEL. 5 SHEETS—SHEET 1.
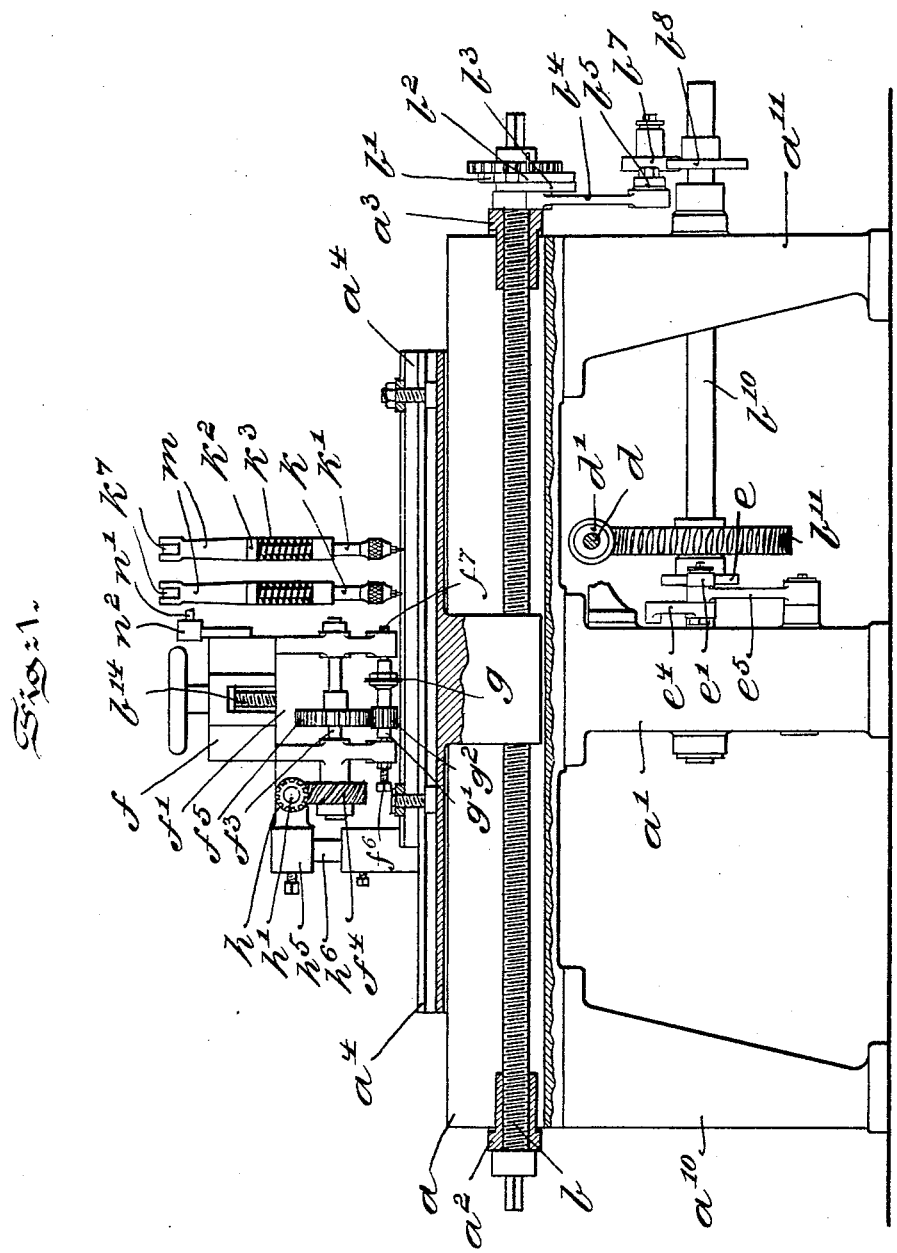

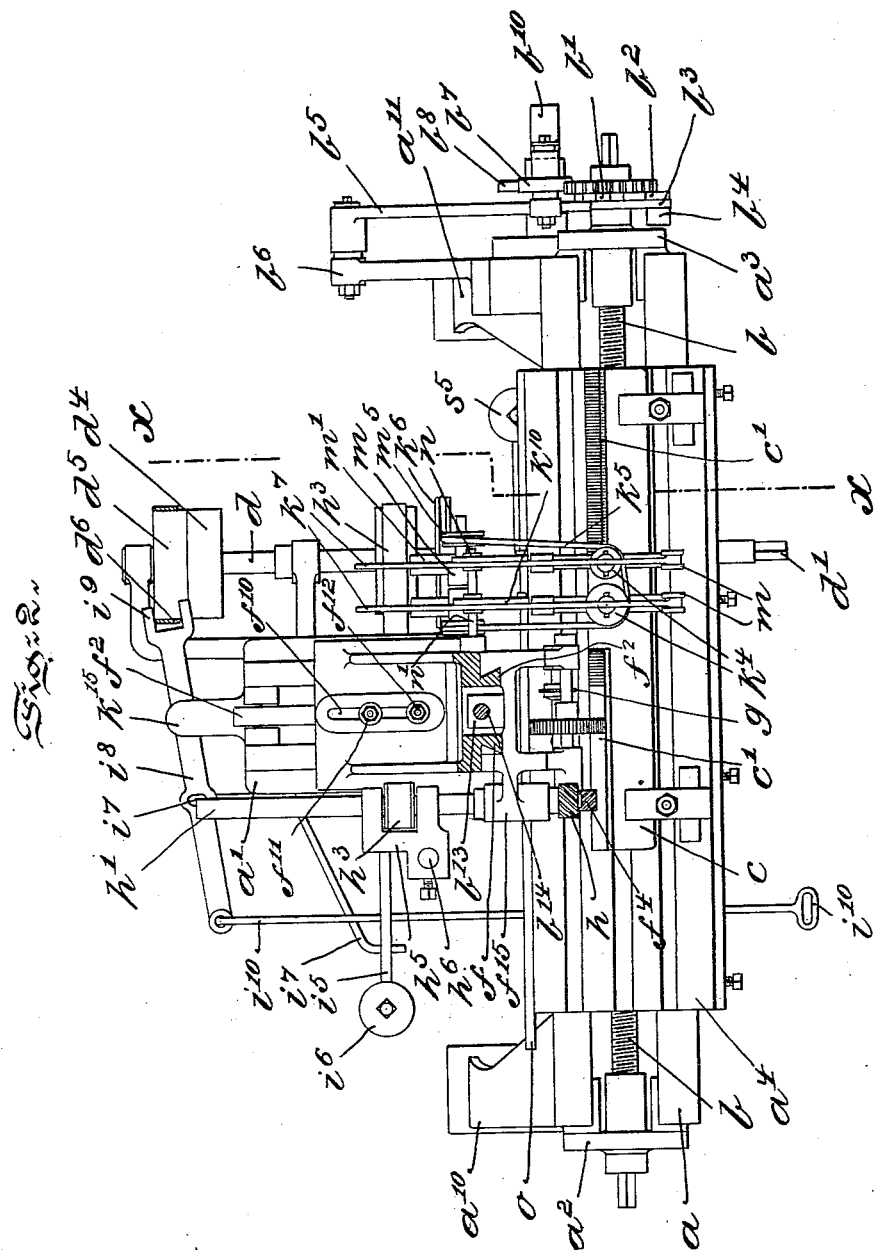

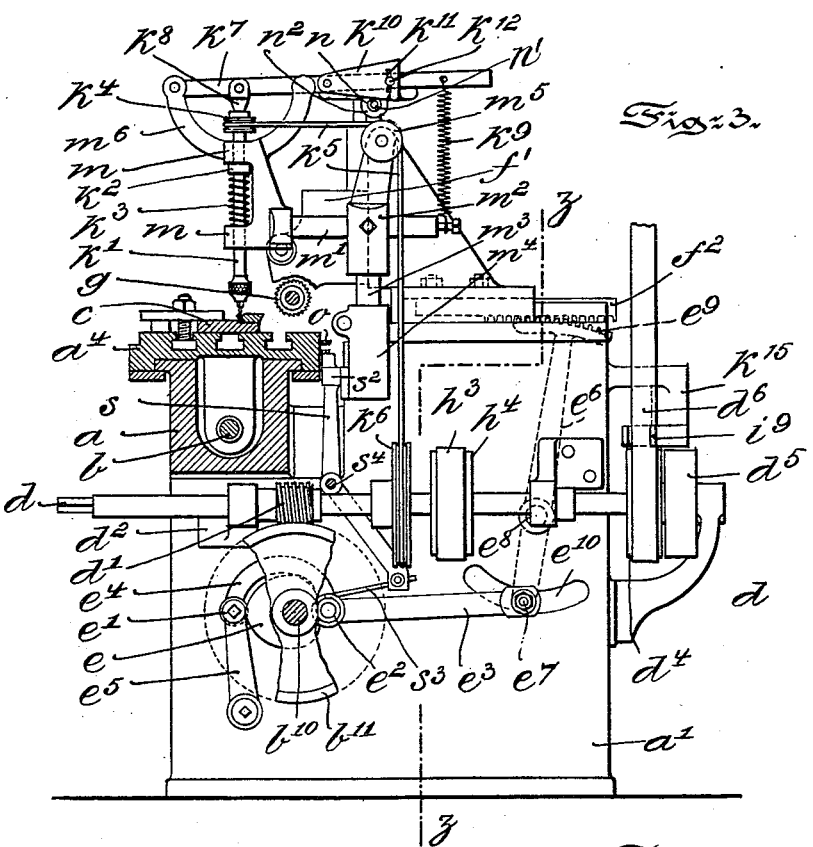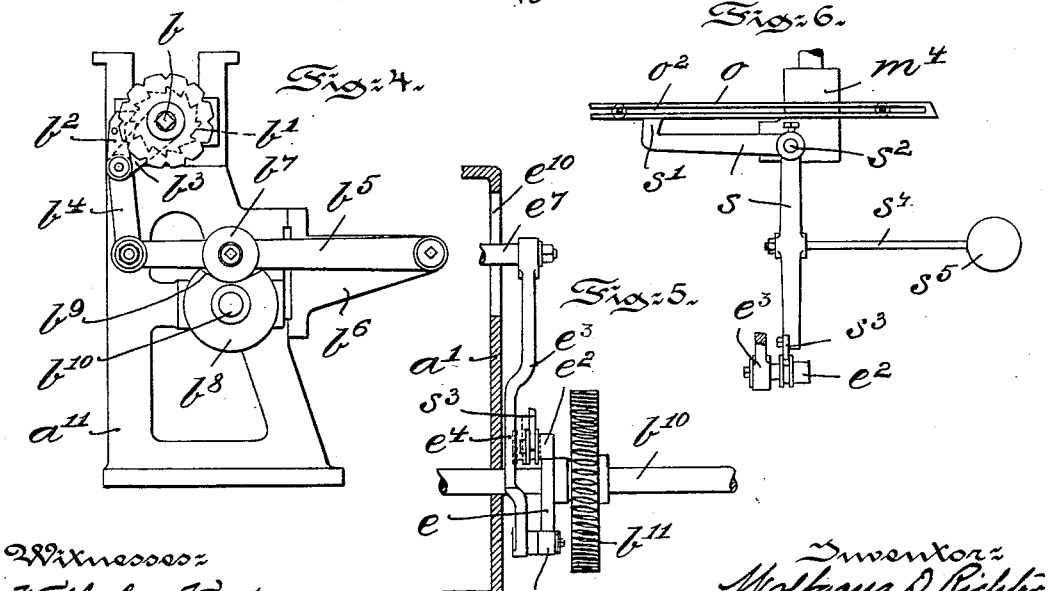

No. 733,425. PATENTED JULY 14, 1903.
W. D. RICHTER.
MACHINE FOR MAKING NEEDLE BARS FOR STRAIGHT KNITTING MACHINES.
APPLICATION FILED AUG. 22, 1902.
NO MODEL. 5 SHEETS—SHEET 4.
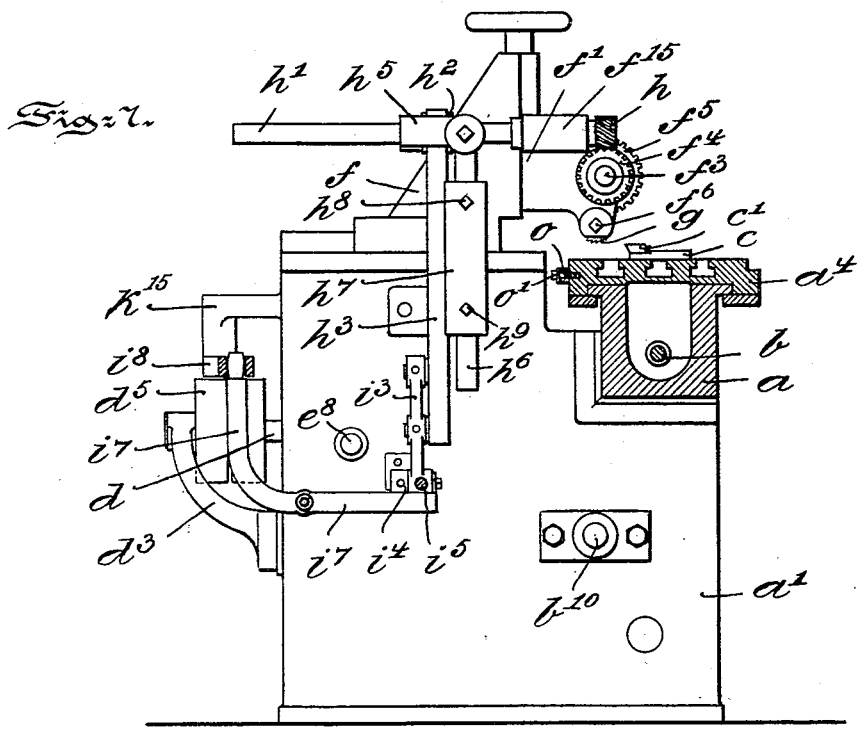
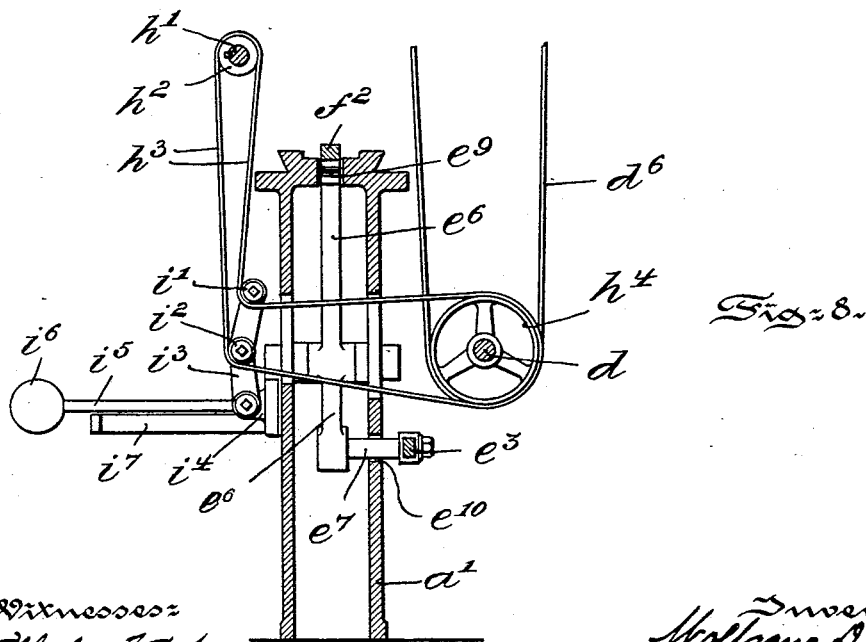

No. 733,425. PATENTED JULY 14, 1903.
W. D. RICHTER.
MACHINE FOR MAKING NEEDLE BARS FOR STRAIGHT KNITTING MACHINES.
APPLICATION FILED AUG. 22, 1902.
NO MODEL. 5 SHEETS—SHEET 5.
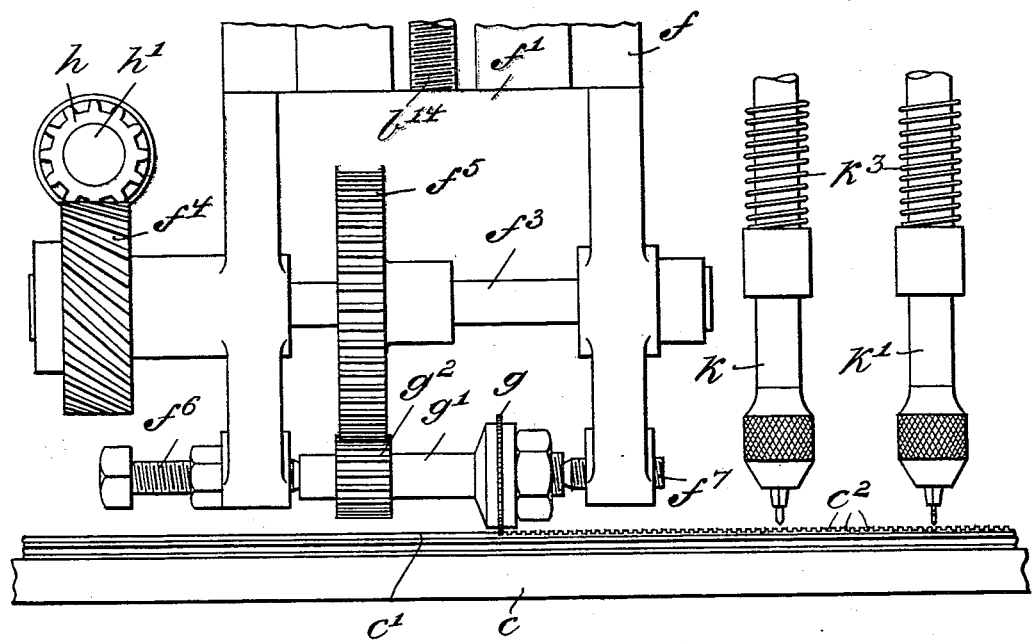
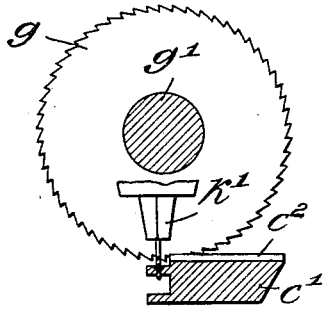
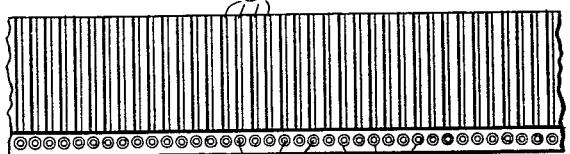
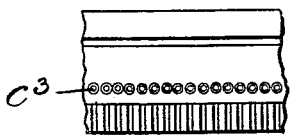
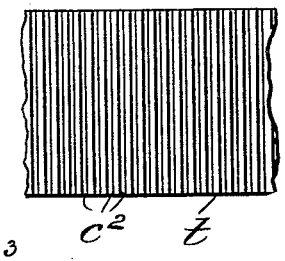
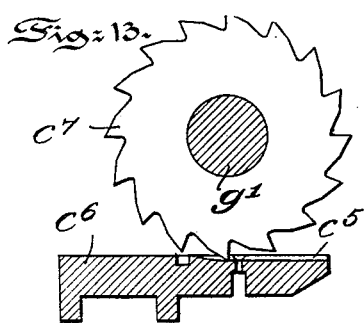
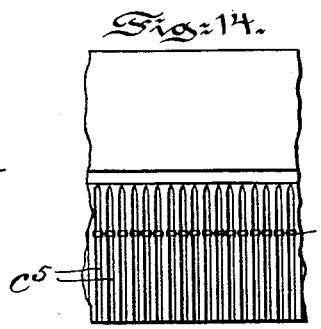
Witnesses:
Wilhelm Vogt
Thomas M. Smith
Inventor:
Wolfgang D. Richter,
By J. Walter Douglas
Attorney
THE NORRIS PETERS CO., PHOTO-LITHO., WASHINGTON, D. C.

No. 733,425.

Patented July 14, 1903.

UNITED STATES PATENT OFFICE.

WOLFGANG D. RICHTER, OF PHILADELPHIA, PENNSYLVANIA.

MACHINE FOR MAKING NEEDLE-BARS FOR STRAIGHT-KNITTING MACHINES.

SPECIFICATION forming part of Letters Patent No. 733,425, dated July 14, 1903.

Application filed August 22, 1902. Serial No. 120,613. (No model.)

*To all whom it may concern:*

Be it known that I, WOLFGANG D. RICHTER, a subject of the Emperor of Germany, residing at the city of Philadelphia, in the county of Philadelphia and State of Pennsylvania, have invented certain new and useful Improvements in Machines for Making Needle-Bars for Straight-Knitting Machines, of which the following is a specification.

My invention has relation to a machine in which needle-bar blanks are finished in one operation, so as to be ready for insertion into the knitting-machine, and in such connection it relates to the construction and arrangement of such a machine.

Heretofore in the finishing of needle-bar blanks the grooves for the reception of the needle-shanks were cut in a certain machine, and after the cutting of the grooves the holes for the reception of the lateral or bent ends of the needles were then centered and thereafter drilled by two successive operations and in independent machines. Although skilled labor in the finishing of the needle-bar blanks was employed, the three distinct operations necessary to complete the work frequently resulted in the production of imperfect bars, chiefly because of the unevenness of the row of holes and because the individual holes were not in proper alinement with the corresponding grooves in the bars.

The principal object of my invention is to provide a machine by means of which needle-bar blanks are finished by a single operation and in which the grooves and holes in respect to their condition and alinement are made perfect and time for the finishing appreciably lessened.

The nature and scope of my present invention will be more fully understood from the following description, taken in connection with the accompanying drawings, forming part hereof, in which—

Figure 1 is a front elevational view, partly in section, of a needle-bar-finishing machine embodying main features of my invention. Fig. 2 is a top or plan view, partly sectioned. Fig. 3 is a cross-sectional view on the line $x\,x$ of Fig. 2 and also illustrating in side elevation the right side of a lateral extension of the framework and the mechanism carried thereby. Fig. 4 is a side elevational view illustrating the right-hand end of the machine. Fig. 5 is a detail view, partly sectioned, illustrating the mechanism for reciprocating the head carrying the groove-cutter. Fig. 6 is a detail view illustrating in side elevation the mechanism for automatically stopping the reciprocatory movement of the head carrying the groove-cutter. Fig. 7 is a cross-sectional view illustrating the left-hand side of a lateral extension of the framework and mechanism carried thereby. Fig. 8 is a cross-sectional view of the extension of the machine on the line $z\,z$ of Fig. 3. Fig. 9 is a detail view, enlarged, illustrating in front elevation the groove-cutter and drills and a portion of the mechanism for actuating the same. Fig. 10 is a detail view, enlarged, showing in side elevation and cross-section the groove-cutter and needle-bar. Figs. 11 and 12 are detail views illustrating in top or plan view portions of a finished needle-bar and a bar for transfer-points. Fig. 13 is respectively a side elevational view of a modified form of a groove-cutter and cross-sectional view of a narrowing-bar to be grooved thereby. Fig. 14 is a top or plan view of a portion of a narrowing-bar, and Fig. 15 is a top or plan view of a portion of a sinker-head bar in which the grooves extend over the whole upper surface of the sinker-head bar.

Referring to the drawings, $a$ represents the bed, supported by standards $a^{10}$ and $a^{11}$, and $a'$ a box-shaped standard of the machine, arranged at right angles to the bed $a$, the said bed-plate and standards adapted to carry certain of the mechanisms of the machine. Within the bed $a$ and by means of brackets $a^2$ and $a^3$, secured thereto, is arranged a screw-spindle $b$, adapted to actuate a platen $a^4$, slidably and suitably secured to said bed $a$, as illustrated in Figs. 3 and 7. To the platen $a^4$ is suitably clamped the needle-bar holder $c$, carrying the needle-bar blank or brass $c'$. The platen conducts the blank by a step-by-step movement beneath the cutting and drilling tools, as will be hereinafter more fully described. At one end of the screw-spindle $b$ is provided a ratchet-wheel $b'$, engaged by a pawl $b^2$, carried by an arm $b^3$, pivotally secured to the spindle $b$. The arm $b^3$ by a link $b^4$ is connected with a lever-arm $b^5$, pivotally connected with a bracket $b^6$, carried by the standard $a^{11}$. Intermediate of the ends of the lever-arm $b^5$ is arranged a roller $b^7$, engaging a cam $b^8$, provided with a depressed surface $b^9$. The cam $b^8$ is secured to a shaft $b^{10}$, carried by the standards $a^{11}$ and $a'$, which shaft $b^{10}$ receives its motion by means of a worm-wheel $b^{11}$, engaged by a worm $d'$ of a shaft $d$, as illustrated in Fig. 1. By the rotation of the cam $b^8$ a step-by-step movement is imparted to the ratchet-wheel $b'$ through the pawl $b^2$ in one direction, and the threaded spindle $b$ is partially rotated, shifting in its movement the platen $a^4$ for a certain distance from right to left in Fig. 1. By replacing the cam $b^8$ and substituting therefor a cam having a more or less deep depression $b^9$ the periodic forward movement of the platen $a^4$ and the needle-bar blank $c'$, secured thereon, can be readily increased or decreased. The shaft $d$ by means of brackets $d^2$ and $d^3$ is secured to the standard $a'$ and is provided with fixed and loose pulleys $d^4$ and $d^5$. Motion is imparted to the shaft $d$ by a belt $d^6$, connecting the fixed pulley $d^4$ with any suitable source of power. As illustrated in Figs. 1 and 3, to the shaft $b^{10}$ is also secured, preferably, a heart-shaped eccentric $e$, engaged by rollers $e'$ and $e^2$, carried by the curved extension $e^4$ of a link $e^3$, which is pivotally supported at one end by a link $e^5$ and at the other end by a lever $e^6$ and its bolt $e^7$, which latter passes through a slot $e^{10}$ in the standard $a'$. The lever $e^6$ by means of a bolt $e^8$ is pivotally arranged within the hollow standard $a'$ and is provided at its free end with a toothed sector $e^9$, engaging a rack $f^2$, secured to a head $f$, carried by and slidable on the standard $a'$. The head $f$ is provided with an adjustable head $f'$, adapted to receive and support the groove-cutting tool or disk $g$. By the rotation of the eccentric $e$ and the intervention of the rollers $e'$ and $e^2$ a reciprocatory movement is imparted to the link $e^3$, which movement by means of the lever $e^6$ is transmitted to the heads $f$ and $f'$, moving the same and the cutter-disk $g$ back and forth over the needle-bar blank $c'$ in a direction transversely to the platen $a^4$. The head $f'$ is provided with a shaft $f^3$, carrying at one end a worm-wheel $f^4$, meshing with a worm $h$, secured to a shaft $h'$. Intermediate of its ends the shaft $f^3$ is provided with a gear-wheel $f^5$, meshing with a gear-wheel $g^2$, secured to the shaft $g'$, carrying the groove-cutter $g$. The shaft $g'$ and cutter $g$ are adjustably held in the head $f'$ by set-screws $f^6$ and $f^7$, engaging the ends thereof, as illustrated in Figs. 1 and 9. The worm $h$ and shaft $h'$ receive their rotary motion from a belt $h^3$, passing over a pulley $h^2$, slidably secured to the shaft $h'$, and a pulley $h^4$, secured to the main shaft $d$, and transmits the same by the intervention of the worm-wheel $f^4$, gear-wheels $f^5$ and $g^2$, and shafts $f^3$ and $g'$ to the cutter-disk $g$ and sets the same in rapid rotation. After the head $f'$ and cutter $g$ have been shifted in their normal position, as illustrated in Figs. 2 and 3, the platen $a^4$, needle-bar holder $c$, and needle-bar blank $c'$ are shifted for a certain predetermined distance from right to left in Figs. 1 and 2, and the rapidly-rotating cutter $g$ is now advanced toward and over the needle-bar blank $c'$ and cuts in the same a groove $c^2$ of right-angular outline, as illustrated in Fig. 1. After completing the cutting of the groove $c^2$ the cutter $g$ is shifted backward through the previously-cut groove, and on reaching its normal position the platen $a^4$ and blank $c'$ are again shifted by the spindle $b$ and ratchet-wheel $b'$, as hereinbefore fully described. The extent of backward and forward movements of the cutter $g$ in a horizontal plane may be readily adjusted by the loosening of the nuts $f^{11}$ and $f^{12}$, engaging the bolts $f^8$ and $f^9$, passing through a slot $f^{10}$, arranged in the head $f'$, and clamping the same to the rack $f^2$, as illustrated in Figs. 2 and 3, to cut a groove of any width desired into the needle-bar or other blank. In order to regulate the depth of the groove $c^2$ to be cut into the blank $c'$, the cutter $g$ and its head $f'$ may be raised and lowered by means of a threaded spindle $b^{14}$, engaging an extension $b^{13}$ of the head $f'$, as illustrated in Fig. 2. Where triangular-shaped grooves $c^5$ are desired—as, for instance, in narrowing-bars $c^6$—a milling-cutter $c^7$ of required form may be readily employed to cut the same, as illustrated in Figs. 13 and 14.

In order to permit of the adjustment of the cutter $g$ and head $f'$ in a vertical plane and to hold the worm $h$ in engagement with the worm-wheel $f^4$, the shaft $h'$, which is supported at its front end by an extension $f^{15}$ of the head $f'$, is engaged intermediate of its ends by a bracket $h^5$, carried by a rod $h^6$. The rod $h^6$ passes through a bracket $h^7$, secured to the standard $a'$, and is held adjustably therein by set-screws $h^8$ and $h^9$, as illustrated in Figs. 2 and 7. Since the bracket $h^7$, carrying the rod $h^6$ and bracket $h^5$, is fixed to the standard $a'$, the pulley $h^2$ must be slidable on the shaft $h'$, and for this purpose is keyed to the shaft $h'$, so as to permit of the reciprocatory movements of the heads $f$ and $f'$ and at the same time to transfer the rotary movement of the main shaft $d$ to the shaft $h'$ and worm $h$.

In case of a breaking of the belt $h^3$ the reciprocatory movement of the heads $f$ and $f'$ and cutter $g$ is instantly stopped by the following preferred mechanism: As illustrated in Figs. 2, 7, and 8, the belt $h^3$ passes over rollers $i'$ and $i^2$, carried by an arm $i^3$, pivotally secured to a bracket $i^4$ of the standard $a'$. To the arm $i^3$ is secured a rod $i^5$, provided at its end with a weight $i^6$ and passing over the free end of a bell-crank lever $i^7$, pivotally secured to the standard $a'$, the other end of which lever engages a belt-shifter $i^8$, carried by a bracket $k^{15}$, preferably integral with the standard $a'$, as shown in Figs. 2 and 7. The forked end $i^9$ of the belt-shifter $i^8$ engages the belt $d^6$ of the main shaft $d$, and to the other end thereof is pivotally secured a hand-rod $i^{10}$, adapted to operate the belt-shifter manually. In case the belt $h^3$ should break the weighted rod $i^5$, normally held out of engagement with the bell-crank lever $i^7$ by the belt and rollers $i'$ and $i^2$, will descend and by striking the bell-crank lever $i^7$ operate the belt-shifter $i^8$, which in turn will shift the belt $d^6$ from the fixed pulley $d^4$ onto the loose pulley $d^5$ and instantly stop the machine, as shown in Fig. 2.

The grooves $c^2$, cut into the needle-bar blank $c'$, are adapted to receive the shank of a needle, (not shown,) and in order to also receive the lateral or bent end of the same the needle-bar must be provided with holes for the reception of such ends. In order to drill the holes at the same time the grooves $c^2$ are cut into the needle-bar blank $c'$ and to finish the needle-bar in one continuous operation, drills $k$ and $k'$ are provided, which center and drill a hole during each operative position of the groove-cutter $g$.

With reference to Figs. 1, 2, and 3, each of the drills $k$ and $k'$ is carried by a bracket $m$, secured to a horizontally-arranged rod $m'$, which is adjustably supported by a bracket $m^2$, carried by a vertically-arranged rod $m^3$. The rod $m^3$ is adjustably connected with a bracket $m^4$, suitably secured to the standard $a'$. The adjustable arrangement of the rods $m'$ and $m^3$ in their respective brackets $m^2$ and $m^4$ permits the ready adjustment of the drills $k$ and $k'$ in vertical and horizontal planes. Each of the drills $k$ and $k'$ has its spindle provided with a collar $k^2$, against which bears the end of a spring $k^3$, surrounding the spindle, the other end of which rests on the bracket $m$, so as to normally raise the drill-point away from the work, as illustrated in Fig. 3. At their upper ends each of the spindles is provided with a pulley $k^4$, engaged by a belt $k^5$, passing over pulleys $m^5$, secured to each of the brackets $m^2$ and over a pulley $k^6$, arranged on the main driving-shaft $d$ of the machine. The rotary motion of the shaft $d$ is in this manner transmitted to the drills $k$ and $k'$, and the same are rapidly rotated. The pulley $k^4$ of the drill $k$, however, is larger than the pulley $k^4$ for the drill $k'$, and for this reason the drill $k$ will rotate more slowly than the drill $k'$. The drill $k$ is the centering-drill and in position is located in advance of the regular drill $k'$, and its object is to drill a conical-shaped recess $c^4$ in the needle-bar blank $c'$, which in the well-known manner prevents the regular drill $k'$ after it enters the recess $c^4$ from moving sidewise during the beginning of the drilling of a hole $c^3$ through the recess $c^4$ in the needle-bar blank $c'$. The required downward movement of the drills $k$ and $k'$ against the tension of the springs $k^3$ is transmitted to each of the same by a lever-arm $k^7$, engaged at its free end by a spring $k^9$, normally tending to depress the lever $k^7$, secured to the rod $m$ by means of the conical-shaped toggle $k^8$, which bears loosely on top of the drill-spindle $k'$, so that when the lever $k^7$ is depressed the drill-spindle will be carried down thereby, but cannot be retracted by the same. This downward movement of the drills takes place only when the head $f$ and groove-cutter $g$ move toward the platten $a^4$. For this purpose a roller $n$, carried by a rod $n'$ of a bracket $n^2$, secured to the head $f$, is moved toward the bracket $m$ and brought into engagement with the contracted end of a cam-plate $k^{10}$ and so permits the descent of the lever-arm $k^7$ by the spring $k^9$. The cam-plate $k^{10}$ by means of a slot $k^{11}$ and bolt $k^{12}$ is adjustably connected with the lever-arm $k^7$, and thus permits of the regulation of the extent of downward movement of the drills $k$ and $k'$. The roller $n$ during the backward movement of the head $f$ raises the lever-arm $k^7$ by rolling under the wide portion of the cam-plate $k^{10}$ and permits the drills $k$ and $k'$ to be raised by the springs $k^3$ to their normal position and out of engagement with the needle-bar blank.

After the groove-cutter $g$ in the above-described manner has completed the cutting of the grooves in the needle-bar blank $c'$ the same continues its reciprocatory movement across the platen $a^4$ until the needle-bar blank $c'$ has been provided with the necessary holes $c^3$ and in this way finished, as will be readily understood from Fig. 2 of the drawings. The holes $c^3$ are drilled directly in alinement with the grooves $c^2$, and the accuracy with which the same are drilled and arranged in an absolutely straight line or row insures a perfectly-finished needle-bar as to all details thereof. Instead of drilling the holes $c^3$ outside of the grooves $c^2$, as illustrated in Figs. 11 and 12, the same may also be drilled in the grooves, as illustrated in Fig. 14. At the same time the machine may also be used for cutting grooves only—as, for instance, in the finishing of a sinker-head bar $t$, as illustrated in Fig. 15. In this instance the brackets $m$, carrying the drills $k$ and $k'$, will be shifted sufficiently backward to hold the drills out of engagement with the sinker-head bar $t$.

As soon as the drilling operations have been completed by the drills $k$ and $k'$ the drills are automatically stopped by the following preferred mechanism: To the platen $a^4$ is secured a bar $o$ by means of bolts, the bar $o$ being provided with a slot $o^3$, preferably extending through the entire body of the bar $o$, as illustrated in Figs. 6 and 7. By loosening the bolts $o'$ the bar may be readily shifted in respect to the platen $a^4$ and clamped in its given position. As illustrated in Fig. 3, the bar $o$ serves to swing or hold a bell-crank lever $s$, which is pivoted in the point $s^2$ to one of the brackets $m^4$ by engaging its end $s'$ outward or sidewise. The lever $s$ is provided with an arm $s^3$, engaging the grooved portion of the roller $e^2$ of the link $e^3$, contacting with the heart-shape eccentric $e$, as illustrated in Fig. 5. As soon as the bar $o$ in the forward movement of the platen $a^4$ is brought out of engagement with the end $s'$ of the bell-crank lever $s$ the lever $s$ under the influence of a weight $s^5$, carried by a rod $s^4$, will swing with its weighted end toward the standard $a'$ and will at the same time bring the roller $e^2$ out of engagement with the heart-shape eccentric $e$. The movement transferred to the link $e^3$ and lever $e^6$ and heads $f$ and $f'$ by the eccentric $e$ will now be stopped, and at the same time the heads $f$ and $f'$ and groove-cutter $g$ will be shifted into inoperative position and will be held in such position by the eccentric $e$ engaging the roller $e'$ of the link $e^3$, as will be readily understood by reference to Fig. 5. Since the stopping of the reciprocatory movement of the rotary cutter $g$ depends upon the relative position of the bar $o$ on the platen $a^4$, it is obvious that by shifting or adjusting the bar $o$ on the platen $a^4$ the operation of the rotary cutter $g$ may be stopped at a predetermined point on a blank.

It will be manifestly obvious that as to some details in the arrangement of the machine modifications may be made without departing from the scope of my invention, and hence I do not wish to be understood as limiting myself to all the constructive details of the machine as illustrated and hereinbefore described; but,

Having thus described the nature and object of my invention, what I claim as new, and desire to secure by Letters Patent, is—

1. In a machine of the character described, a platen or work-holder, means for automatically advancing the platen with a step-by-step movement in the machine, a rotary cutter arranged above the platen, means for reciprocating said cutter across the platen and work, means for rotating said cutter during its reciprocatory movement, a drill arranged above the platen and having a vertical movement toward or away from the platen, means for rotating said drill, means for depressing the drill toward the platen, and mechanism controlled by the reciprocatory movement of the cutter and arranged to control the vertical movement of the drill.

2. In a machine of the character described, a platen or work-holder, means for automatically advancing the platen with a step-by-step movement in the machine, a rotary cutter arranged above the platen, means for reciprocating said cutter across the platen and work, means for rotating the cutter during its reciprocatory movement, centering and drilling tools arranged above the platen and having a movement toward or away from the platen, said centering-tool being arranged side by side and in advance of the drilling-tool, means for depressing both tools simultaneously toward the platen, means for rotating both tools simultaneously and mechanism controlled by the reciprocatory movement of the cutter and arranged to control the vertical movement of the drill.

3. In a machine of the character described, a platen or work-holder and means for automatically shifting the same with a step-by-step movement in the machine, in combination with a groove-cutting means, mechanism for causing said groove-cutting means to traverse the platen during the periods between its step-by-step movement and a centering and hole-drilling mechanism and means for causing said centering and hole-drilling mechanism to approach the platen during said fixed periods, the groove-cutting mechanism and drilling mechanism coöperating in the finishing of the work upon the platen and arranged in fixed relationship with each other.

4. In a machine of the character described, a rotary cutter, a belt adapted to rotate said cutter, a belt-shifting mechanism located adjacent to said belt and arranged to be operated by the breaking of said belt, a second belt conveying power to the machine, and intermediate mechanism connecting the belt-shifting mechanism with said belt.

5. In a machine of the character described, a cutter, a train of gears adapted to rotate said cutter, a belt adapted to actuate said train of gears, a belt-shifting mechanism located adjacent to said belt and arranged to be operated by the breaking of said belt, a second belt conveying power to the machine, and intermediate mechanism connecting the belt-shifting mechanism with said belt.

6. In a machine of the character described, a platen or work-holder and means for automatically shifting the same with a step-by-step movement in the machine, in combination with a groove-cutting means, mechanism for causing said groove-cutting means to traverse the platen during the periods between its step-by-step movement, a centering and hole-drilling mechanism, and means for causing said centering and hole-drilling mechanism to approach the platen during said fixed periods, the groove-cutting mechanism and drilling mechanism coöperating in the finishing of the work upon the platen and arranged in fixed relationship with each other, and means for automatically stopping the reciprocatory movement of the cutter and drills and mechanism controlled by the travel of the platen and arranged to operate said automatic stopping means.

In testimony whereof I have hereunto set my signature in the presence of two subscribing witnesses.

WOLFGANG D. RICHTER.

Witnesses:
J. WALTER DOUGLASS,
THOMAS M. SMITH.